(12) United States Patent
Damour et al.

(10) Patent No.: US 12,270,494 B2
(45) Date of Patent: Apr. 8, 2025

(54) COUPLING FOR JUNCTION OF PIPE-IN-PIPE PIPELINE

(71) Applicant: ITP SA, Louveciennes (FR)

(72) Inventors: Jean-Aurélien Damour, Louveciennes (FR); Christian Geertsen, Louveciennes (FR)

(73) Assignee: ITP SA, Louveciennes (FR)

( * ) Notice: Subject to any disclaimer, the term of this patent is extended or adjusted under 35 U.S.C. 154(b) by 69 days.

(21) Appl. No.: 17/148,351

(22) Filed: Jan. 13, 2021

(65) Prior Publication Data

US 2021/0215279 A1 Jul. 15, 2021

(51) Int. Cl.
| | |
|---|---|
| *F16L 13/11* | (2006.01) |
| *C04B 14/06* | (2006.01) |
| *C04B 28/06* | (2006.01) |
| *F16L 13/02* | (2006.01) |
| *C04B 103/12* | (2006.01) |
| *C04B 103/32* | (2006.01) |

(52) U.S. Cl.
CPC .............. *F16L 13/11* (2013.01); *C04B 14/06* (2013.01); *C04B 28/06* (2013.01); *F16L 13/02* (2013.01); *C04B 2103/12* (2013.01); *C04B 2103/32* (2013.01)

(58) Field of Classification Search
CPC ........... F16L 13/11; F16L 13/02; C04B 14/06; C04B 28/06; C04B 2103/12; C04B 2103/32

USPC ....................................................... 285/290.1
See application file for complete search history.

(56) References Cited

U.S. PATENT DOCUMENTS

| | | | | |
|---|---|---|---|---|
| 4,053,247 A | * | 10/1977 | Marsh, Jr. ............. | F16L 13/147 403/279 |
| 2014/0375049 A1 | * | 12/2014 | Mair ..................... | F16L 39/005 285/123.1 |
| 2017/0088465 A1 | * | 3/2017 | Touzo ..................... | C04B 24/04 |
| 2019/0062214 A1 | * | 2/2019 | Al-Kutti ................. | C04B 28/04 |

FOREIGN PATENT DOCUMENTS

| | | |
|---|---|---|
| AT | 385 575 B | 4/1988 |
| FR | 2721681 A1 * | 12/1995 |
| FR | 3 049 038 A1 | 9/2017 |
| GB | 423 870 A | 2/1935 |
| WO | 2014/035923 A1 | 3/2014 |

\* cited by examiner

*Primary Examiner* — Coris Fung
*Assistant Examiner* — Catriona M Corallo
(74) *Attorney, Agent, or Firm* — Oliff PLC

(57) ABSTRACT

A coupling for pipe-in-pipe pipeline tubing formed of an assembly of sections each incorporating an inner pipe and an outer pipe butt-welded to the inner pipe, two successive sections being joined together by the welding of respective inner pipes delimiting a segment of inner pipe. The coupling is formed by a sleeve arranged perpendicularly to the segment and a filler material constituted by a quick-set mortar based on aluminous cement and sand, the filler material being arranged in the free space delimited by the sleeve, the segment and the outer pipes of two successive sections.

13 Claims, 3 Drawing Sheets

COUPLING FOR JUNCTION OF PIPE-IN-PIPE PIPELINE

BACKGROUND OF THE INVENTION

1. Field of the Invention

The technical scope of the present invention is that of couplings for the junctions of pipe-in-pipe pipelines. These pipelines are formed of sections assembled together by welding on an off shore vessel.

2. Description of the Related Art

In the oil sector, pipe-in-pipe tubing has been used for several decades to ensure the thermal insulation of the pipelines formed by the successive assembly by welding of pipe-in-pipe tubing sections of between 6 metres and 50 metres in length. Each section consists of an inner pipe and a concentric outer pipe and thermal insulation in the annulus formed by these two pipes.

At each end, the outer tube is deformed into a cone shape to close the annulus hermetically by welding the outer pipe to the inner pipe. The inner pipe is slightly longer than the outer pipe.

These sections are assembled one after the other by welding on an offshore lay barge to form pipelines of great length, typically of between 0.5 km and 50 km. The weld made on the barge is a butt weld between the two inner pipes of two successive sections. After this welding, the junction between the two sections is formed only by the bare single-casing inner pipe.

To rigidify this link, a thermally insulated sleeve is slid over and centered on the single-casing pipe joint comprising the weld and covers the outer pipe on either side by a length of 1 to 3 times the diameter of the pipe-in-pipe tubing to ensure sufficient bending moment transfer efficiency. This sleeve is a double-cased pipe with thermal insulation in the annulus. The length of the sleeve is typically 1.8 to 3 m and its inner diameter is greater than the outer diameter of the exterior pipe to enable its installation.

To ensure the sleeve is held in position on the tubing, a hardenable filling material is poured or injected in a known manner to fill the volume of the junction between the inner and outer pipes of the main tubing and the inner pipe of the sleeve (typical volume between 20 to 50 litres). The filling operation for the hardenable material is performed on the lay barge.

This hardenable material is typically a polyurethane resin. Thermal performance at the junction between two sections is ensured by the insulated sleeve. The sleeve coupled with the hardenable material filling the interstitial volume also provides a mechanical function which is that of reinforcing the single-cased section of tubing. Without this sleeve the junctions between two successive sections of the pipe-in-pipe tubing would be weak points in the pipeline from a mechanical perspective and would not be able to withstand the mechanical constraints to which it is subjected during the laying and other modes of operation of the pipeline once in place on the seabed.

The mechanical efficiency of the junction is classically evaluated by the Stress Transmission Factor (STF). This is the ratio between the bending constraints (axial constraints) of the inner pipe in the middle of the junction and the inner pipe in the middle of the pipe-in-pipe section of the pipeline. The lower the STF, the more efficient the junction.

The technical advantages of the junction described above enable pipeline installers to make considerable cost savings as laying this pipeline requires only one weld per section of pipe-in-pipe tubing.

During offshore laying operations, the duration of each operation is critical, as the daily cost of the lay barge is extremely high, typically between 200,000.00 EURO and 1,000,000.00 EURO per day. Each gain in time in the successive operations is a saving which makes the solution more competitive. The fact of being able to propose a junction solution that only requires one weld saves time and halves the technical welding risk for the operators of off-shore lay barges. Once the two inner pipes have been welded together and the weld inspected and protected, the full installation of the sleeve by means of half-shells can be performed quickly, typically in less than 10 minutes.

A current limitation of this joining method is resistance to high temperatures. In fact, the hardenable materials used today, of the polyurethane resin type, cannot withstand temperatures of over 100° C. in a marine environment (pressurized water) or even 80° C. depending on the planned duration of the load (typically 10-20 years). Ageing tests performed in autoclaves show that the mechanical properties of a polyurethane resin deteriorate at temperatures of over 100° C., or even 80° C.

Another material used is di-polycyclopentadiene (DPCD) which is temperature-resistant up to 180° C. However, this DPCD shows significant thermal and chemical shrinkage of several percent by volume during hardening. This shrinkage means that this material does not allow good transmission of mechanical forces between the two successive sections and the sleeve.

Furthermore, this shrinkage is made worse by the poor adhesion of DPCD to the walls of the sleeve, the inner pipe and the outer pipe of the pipeline.

The play created by this shrinkage is greater in the central part of the junction coupling, since this is where there is the greatest thickness of hardenable material, between around 20 and 50 mm. In this part, shrinkage can attain 1 to 4 mm.

This naturally means that the mechanical constraints to which the inner pipe of the pipeline are subjected will not be transmitted efficiently to the sleeve, which in the worst cases, may move vertically under its own weight or generally slide along the pipeline.

This results in a reduction in the lifetime of the pipeline with respect to mechanical fatigue, since this type of tubing is subjected to mechanical constraints both during the offshore laying and throughout the operational functioning of the tubing.

SUMMARY OF THE INVENTION

The aim of the invention is to propose a coupling for the junction of pipeline sections that does not suffer such drawbacks.

The invention thus relates to a coupling for pipe-in-pipe pipeline tubing formed of an assembly of sections each incorporating an inner pipe and an outer pipe butt welded to the inner pipe, two successive sections being joined together by the welding of respective inner pipes delimiting a segment of inner pipe, wherein it is formed by a sleeve arranged perpendicularly to the weld and a filler material constituted by quick-set mortar based on aluminous cement and sand, said filler material being arranged in the free space delimited by the sleeve, said segment and the outer pipes of two successive sections.

According to one characteristic of the coupling according to the invention, the filler material has the following composition in mass:

30 to 49% of aluminous cement
40 to 58% of diorite sand,
0.6 to 1% of super-plasticizer,
0.5 to 1% of setting accelerator, and
adjustment to 100% using water.

Advantageously, the filler material has the following composition in mass:

33% of aluminous cement
55% of diorite sand,
0.7% of super-plasticizer,
0.6% of setting accelerator, and
adjustment to 100% using water.

Advantageously again, the filler material has the following composition in mass:

39% of aluminous cement
50% of diorite sand,
0.7% of super-plasticizer,
0.6% of setting accelerator, and
adjustment to 100% using water.

Advantageously again, the filler material has the following composition in mass:

44% of aluminous cement
45% of diorite sand,
0.8% of super-plasticizer,
0.6% of setting accelerator, and
adjustment to 100% using water.

Advantageously again, the filler material has the following composition in mass:

47% of aluminous cement
41% of diorite sand,
1% of super-plasticizer,
0.9% of setting accelerator, and
adjustment to 100% using water.

The invention also relates to a process to produce a coupling in which two sections of pipe-in-pipe pipeline are brought together, and then the inner pipes are welded together, wherein a sleeve is positioned perpendicularly to the weld of the inner pipes and the filler material is injected.

One advantage of the present invention lies in the resistance to ageing of the filler material at temperatures of up to 180° C. and its setting time of less than 10 mn.

Another advantage of this mortar is that it does not shrink while setting.

Yet another advantage of this material lies in the fact that the modulus of elasticity in compression of the mortar remains relatively constant in the temperature range of this application. The modulus of elasticity is high, for example, between 20,000 MPa and 35,000 MPa.

Yet another advantage of this filler material lies in the fact that the mortar is a material with a thermal expansion coefficient similar to that of steel.

BRIEF DESCRIPTION OF THE DRAWINGS

Other characteristics, advantages and particulars of the invention will become apparent from the additional description given hereafter with reference to the drawings, in which.

DETAILED DESCRIPTION OF THE EMBODIMENTS OF THE INVENTION

The invention will now be described in greater detail. As indicated previously a pipe-in-pipe pipeline is formed of several sections joined together so as to produce lengths of a few hundred to a few thousand metres. The issue is to couple together these different sections and to consolidate the junction between successive sections.

Figure 1:
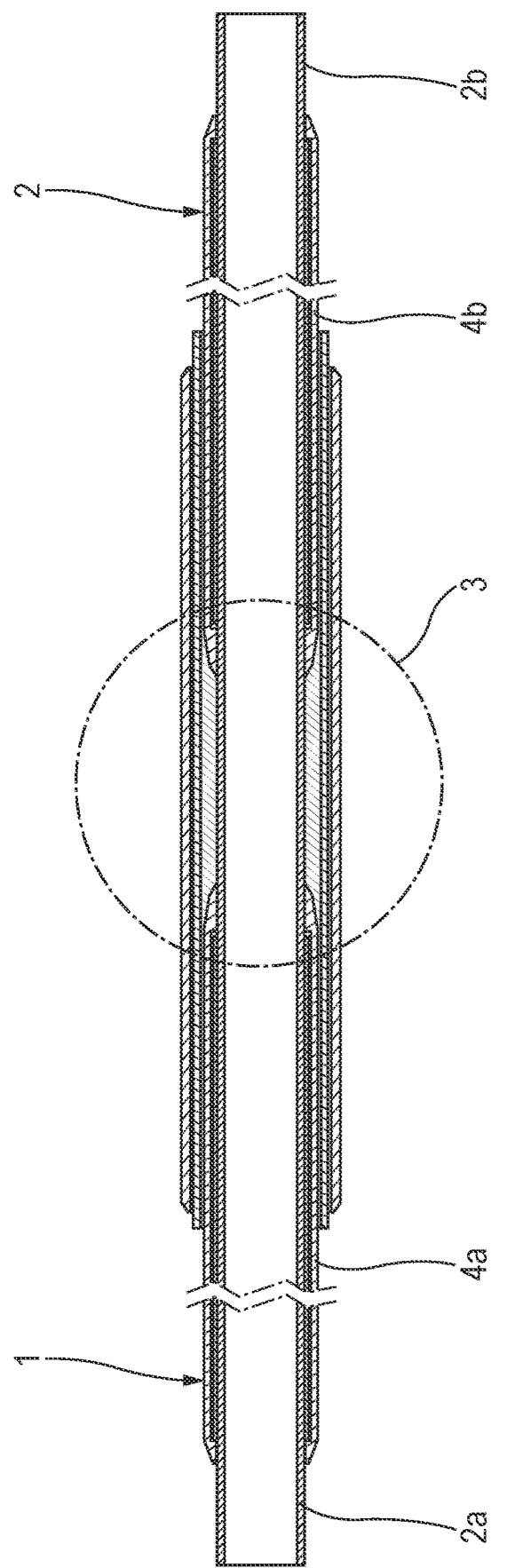
FIG. 1 show a section view of two sections of pipeline assembled together.

FIG. 1 shows two sections 1 and 2 of pipe-in-pipe tubing fitted with a coupling 3. It goes without saying that the pipeline is constituted by a great number of sections, according to the wishes of the customer. Each section 1 or 2 comprises an inner pipe 2a, 2b and an outer pipe 4a, 4b between which the annulus thus delimited is filled with thermal insulation, not shown.

Figure 2:
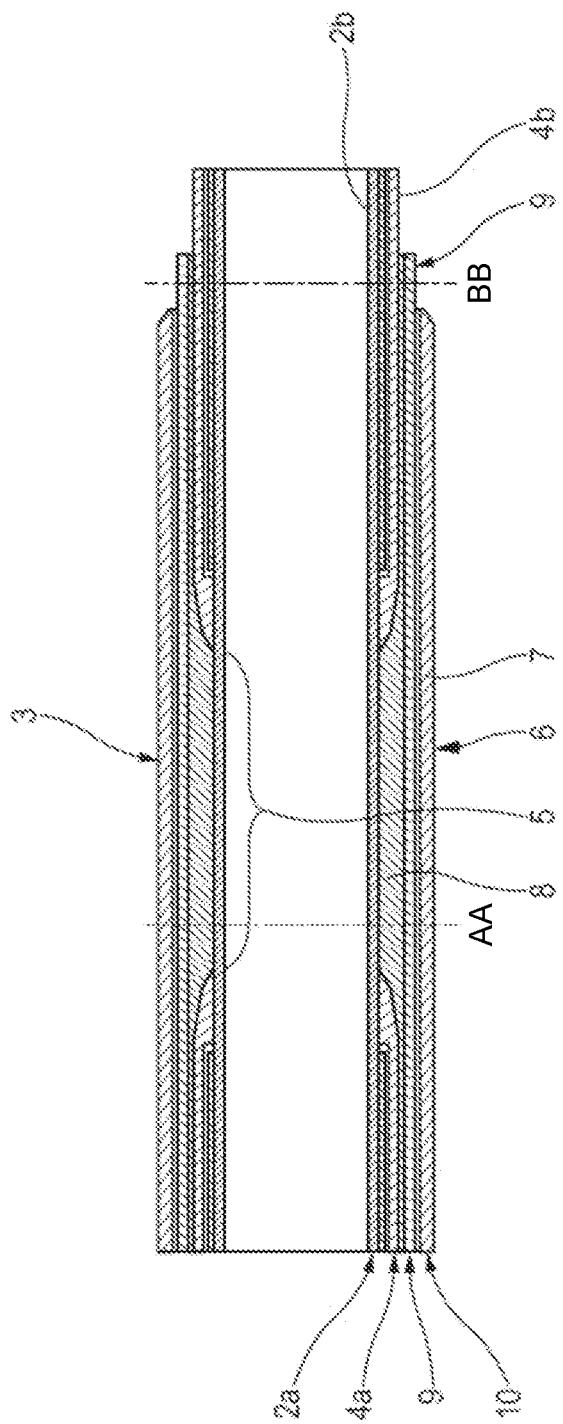
FIG. 2 is a longitudinal section view of the junction coupling according to the invention of a pipe-in-pipe pipeline junction.

FIG. 2 shows a longitudinal section view of the coupling 3 where the inner pipes 2a, 2b and outer pipes 4a, 4b can be seen. Each outer pipe is classically butt welded onto the inner pipes after its extremities have been flanged as can be seen in the figure. The inner pipes 2a and 2b have been welded together delimiting a segment 5 with a single inner pipe.

As explained previously, this segment is reinforced by means of a coupling 6 according to the invention that is constituted by a sleeve 7 positioned perpendicularly to the segment 5 and a filler material 8. The sleeve 7 is in the form of a double-cased pipe. The filler material 8 is arranged in the free space delimited by the sleeve 7, said segment 5 and the outer pipes 4a and 4b of the two successive sections 1 and 2.

This filler material 8 is constituted by a quick-set aluminous cement and sand-based mortar whose composition will be explained after.

Figure 3:
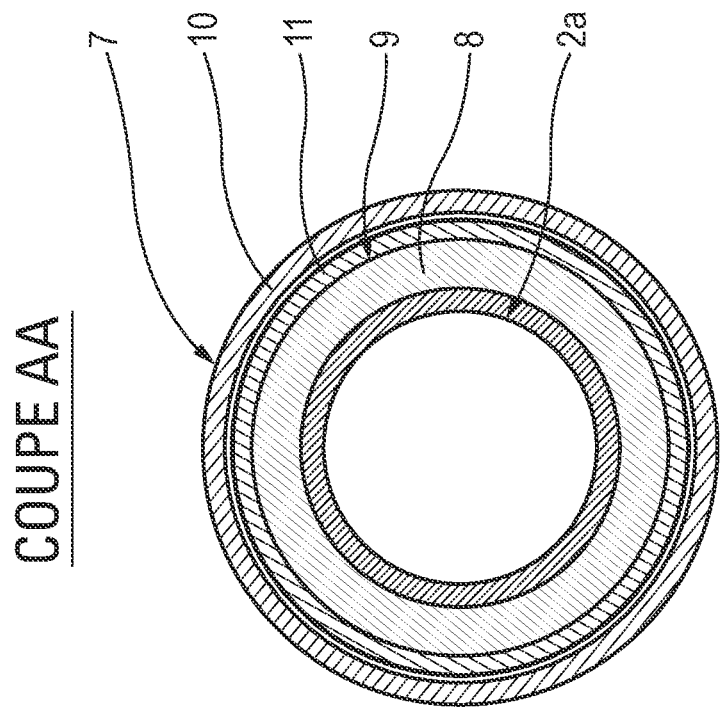
FIG. 3 is a cross section view of the junction coupling according to the invention.

In FIG. 3, which is the axial section along AA in FIG. 2, the inner pipe 2a is shown, with the filler material 8 and the sleeve 7 formed by its sleeve inner pipe 9 and sleeve outer pipe 10 separated by thermal insulation 11. The filler material 8 can be seen to fully occupy the free space available between the segment 5 and the sleeve 7.

Figure 4:
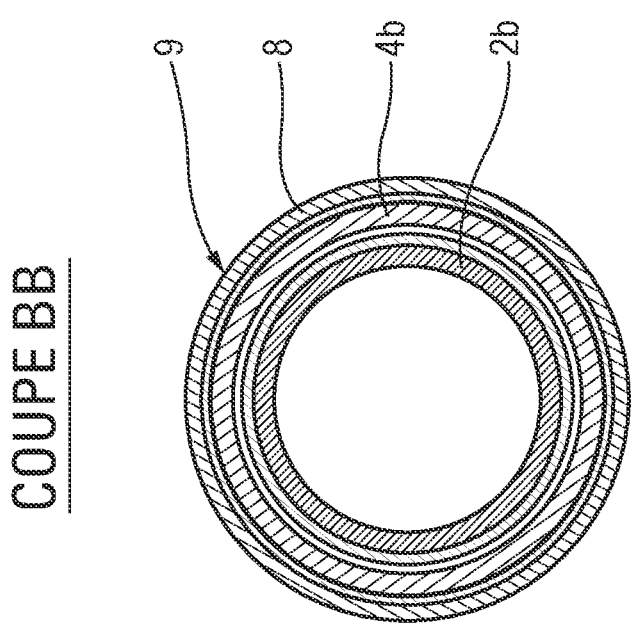
FIG. 4 is another cross section of the junction coupling according to the invention.

FIG. 4, which is an axial section view along BB in FIG. 2, shows the inner pipe 2b, the outer pipe 4b, the filler material 8 and the inner pipe 9 of the sleeve 7.

According to the invention, the filler material 8 is constituted by an aluminous-based cement with the following composition in mass:

30 to 49% of aluminous cement
40 to 58% of diorite sand,
0.6 to 1% of super-plasticizer,
0.5 to 1% of setting accelerator, and
adjustment to 100% using water.

One skilled in the art may, depending on the technical requirements, determine the composition to be adopted by choosing the appropriate percentage.

Thus, the following compositions may be used:

Example 1

33% of aluminous cement
55% of diorite sand,
0.7% of super-plasticizer,
0.6% of setting accelerator, and
adjustment to 100% using water.

Example 2

39% of aluminous cement
50% of diorite sand,
0.7% of super-plasticizer,
0.6% of setting accelerator, and
adjustment to 100% using water.

Example 3

44% of aluminous cement
45% of diorite sand,
0.8% of super-plasticizer,
0.6% of setting accelerator, and
adjustment to 100% using water.

Example 4

47% of aluminous cement
41% of diorite sand,
1% of super-plasticizer,
0.9% of setting accelerator, and
adjustment to 100% using water.

The above mortar compositions may be produced in the following manner.

Firstly, an intimate mixture is made of aluminous cement and diorite sand, the super-plasticizer is then added followed by the water. The intimate mixture thus obtained can be kept soft so long as the setting accelerator is not added. When the coupling is to be made, the accelerator is added to the mortar and mixed in and the resulting mixture must be used very rapidly.

To make the coupling 3, the inner pipes 2a and 2b are welded together, then the sleeve is placed perpendicularly to the segment 5 covering the outer pipes, respectively 4a and 4b, then the mortar is quickly poured or injected into the free space delimited by the sleeve 7, the segment 5 and the outer pipes 4a and 4b.

For a filler material intended for temperatures of up to 180° C., the properties of this mortar are excellent, namely:
Setting time: <10 min; the shorter this time the more economically competitive the solution. With a long pre-mixing time, the setting time may be between 3 and 5 mins, after the accelerator has been added.
Compressive strength:
>10 MPa when fresh,
>60 MPa when mature;
Maniability: The mortar can be poured or injected between two concentric pipes with annular space of between 5 and 10 mm at the radius or more, typically up to 80 mm;
No shrinkage upon setting
Resistance to ageing in a marine environment under a pressure of 100 bars, or even up to $220.10^5$ Pa, at a temperature of 140° C. or even up to 180° C.
Modulus of elasticity in compression: between 20,000 MPa and 35,000 MPa;
Flexural modulus of elasticity: between 6,000 and 15,000 MPa;
Resistance to cyclic mechanical stress: no deterioration of the mortar between 2 pipes when the pipes and cyclically stressed over a large number of cycles, by flexion for example.

Typical diameters of pipe-in-pipe tubing are 170 mm and 220 mm, respectively for the inner pipe 2a or 2b and the outer pipe 4a or 4b for the smallest, and can reach 400 mm and 500 mm, respectively for the inner pipe 2a and 2b and the outer pipe 4a and 4b, for the largest sizes installed. The diameters of the pipes of the double-cased sleeve 7 are greater than the diameter of the outer pipe 4a and 4b of the tubing to enable the sleeve to be positioned over the weld.

Typical clearance between the outer pipe of the tubing and the inner pipe of the sleeve is between 5 mm and 15 mm in the thin parts and the typical clearance between the inner pipe of the tubing and the inner pipe of the sleeve is between 25 mm to 80 mm in the central part. It is this space which is filled with mortar according to the invention.

The advantage of this mortar is its resistance to ageing at temperatures of up to 180° C. and its setting time of less than 10 min which makes it able to be used as a filler material for the coupling 7 of offshore pipelines during the laying of such pipelines by offshore barges and for operating temperatures of up to 180° C.

Another advantage of this mortar is that it can be used for S-lay or J-lay modes of installation as it requires a single pouring or injecting operation to fill the space between the sleeve and the pipeline at the junction and once the sleeve is in position over the weld joining the two sections of pipeline.

Another advantage of this mortar is that it does not shrink when setting between 2 concentric pipes and with play in the range of 5 mm to 15 mm in the fins or 25 mm to 80 mm in the central part of the junction.

Another advantage of this junction configuration is the improved mechanical efficiency of the junction of these two pipe-in-pipe sections with the sleeve. In fact, the mechanical properties of such a mortar are greater than those of other hardenable materials such as polyurethane resin or di-polycyclopentadiene (DPCD). The modulus of elasticity in compression of this mortar is in the range of 28,000 MPa whereas it is in the range of 2,000 MPa for a polyurethane resin or DPCD at ambient temperature. The high modulus of elasticity of the mortar enables better transmissions of the mechanical stresses between the pipeline and the sleeve at the junction.

With identical dimensions, the junction using this mortar as a filler material 8 will have better flexural rigidity than the same junction using a resin or DPCD by way of a filler material. In this configuration, this improved transmission of the mechanical stresses between the pipeline and the sleeve enables a reduction in the mechanical constraints in the single-walled section of the pipeline thereby improving its flexural resistance and its fatigue life.

Another advantage of this configuration is that the modulus of elasticity in compression of the mortar remains relatively constant over the temperature range of this application whereas this modulus reduces when the temperature increases in a polyurethane resin or DPCD. The mechanical efficiency of the junction is thus relatively constant over the operating temperature range of this application.

Another advantage of this configuration is that, thanks to the superior modulus of elasticity in compression of this mortar with respect to PU resin, for example, the geometry of the double-cased sleeve (diameter and thickness of pipes, length) can be optimized. In fact, the flexural rigidity of the coupling mainly depends on the length of the sleeve 7, the flexural rigidity of the sleeve 7 and the modulus of elasticity in compression of the filler material 8. Given that the mortar has a modulus of elasticity in compression more than 10 times greater than that of a PU resin or a DPCD, the sleeve 7 may be selected shorter and/or with a lower flexural rigidity (=thinner pipe thicknesses) whilst ensuring the same flexural rigidity of the junction.

As the doubled-cased thermally-insulated sleeve 7 also plays a role in reducing the thermal losses from the single-cased section of the pipeline, a balance will have to be found for the sleeve geometry that both ensures a flexural rigidity and thermal performance of the junction in line with the pipeline specifications.

Another advantage of this filler material 8 is that this mortar is a material with a thermal dilatation coefficient in the range of $12 \cdot 10^{-6}$ m/(m·K). This thermal dilatation coefficient is similar to the thermal dilatation coefficient of the steels used for the pipelines and the double-cased sleeve. This enables the thermal constraints operating between the steel pipes and the filler material of the junction to be limited. Indeed, in operation, the inner pipe of the pipeline will be at a temperature of 100° C. or even up to 180° C., the mean temperature of the junction will increase and thermal constraints may appear due to the differences in thermal dilatation between the steels of the pipeline and the filler material. This will not be the case for this configuration using this mortar.

Another advantage of this configuration is that the inner pipe of the sleeve may be deformed by a few millimetres (from 2 to 10 mm for example) inwards at one or several places along its length to improve the sliding resistance of the sleeve by geometrical impediment.

What is claimed is:

1. A coupling system for pipe-in-pipe pipeline tubing, the coupling system comprising:
    pipe-in-pipe pipeline tubing comprising an assembly of sections each incorporating an inner pipe and an outer pipe butt-welded to the inner pipe, two successive sections being joined together by the welding of the respective inner pipes delimiting a segment of the joined inner pipe;
    a sleeve arranged perpendicularly to the segment of the joined inner pipe; and
    a filler material constituted by a quick-set mortar based on aluminous cement and sand, the filler material being arranged in a free space delimited by the sleeve, the segment of the joined inner pipe, and the respective outer pipes of the two successive sections.

2. The coupling system for pipe-in-pipe pipeline tubing according to claim 1, wherein the filler material has the following composition in mass:
    30 to 49% of the aluminous cement
    40 to 58% of diorite sand,
    0.6 to 1% of super-plasticizer,
    0.5 to 1% of setting accelerator, and
    adjustment to 100% using water.

3. The coupling system for pipe-in-pipe pipeline tubing according to claim 2, wherein the filler material has the following composition in mass:
    33% of the aluminous cement
    55% of diorite sand,
    0.7% of super-plasticizer,
    0.6% of setting accelerator, and
    adjustment to 100% using water.

4. The coupling system for pipe-in-pipe pipeline tubing according to claim 2, wherein the filler material has the following composition in mass:
    39% of the aluminous cement
    50% of diorite sand,
    0.7% of super-plasticizer,
    0.6% of setting accelerator, and
    adjustment to 100% using water.

5. The coupling system for pipe-in-pipe pipeline tubing according to claim 2, wherein the filler material has the following composition in mass:
    44% of aluminous cement
    45% of diorite sand,
    0.8% of super-plasticizer,
    0.6% of setting accelerator, and
    adjustment to 100% using water.

6. The coupling system for pipe-in-pipe pipeline tubing according to claim 2, wherein the filler material has the following composition in mass:
    47% of aluminous cement
    41% of diorite sand,
    1% of super-plasticizer,
    0.9% of setting accelerator, and
    adjustment to 100% using water.

7. The coupling system for pipe-in-pipe pipeline tubing according to claim 1, wherein the sleeve is a double-cased pipe comprising a sleeve inner pipe and a sleeve outer pipe.

8. A process to produce the coupling system according to claim 1 comprising bringing the two successive sections together, and then welding the inner pipes together, wherein the sleeve is positioned perpendicularly to the segment of the inner pipes and the filler material is injected.

9. The process to produce the coupling system according to claim 8, wherein the filler material has the following composition in mass:
    30 to 49% of the aluminous cement
    40 to 58% of diorite sand,
    0.6 to 1% of super-plasticizer,
    0.5 to 1% of setting accelerator, and
    adjustment to 100% using water.

10. The process to produce the coupling system according to claim 9, wherein the filler material has the following composition in mass:
    33% of the aluminous cement
    55% of diorite sand,
    0.7% of super-plasticizer,
    0.6% of setting accelerator, and
    adjustment to 100% using water.

11. The process to produce the coupling system according to claim 9, wherein the filler material has the following composition in mass:
    39% of the aluminous cement
    50% of diorite sand,
    0.7% of super-plasticizer,
    0.6% of setting accelerator, and
    adjustment to 100% using water.

12. The process to produce the coupling system according to claim 9, wherein the filler material has the following composition in mass:
    44% of the aluminous cement
    45% of diorite sand,
    0.8% of super-plasticizer,
    0.6% of setting accelerator, and
    adjustment to 100% using water.

13. The process to produce the coupling system according to claim 9, wherein the filler material has the following composition in mass:
    47% of the aluminous cement,
    41% of diorite sand,
    1% of super-plasticizer,
    0.9% of setting accelerator, and
    adjustment to 100% using water.

* * * * *

UNITED STATES PATENT AND TRADEMARK OFFICE
CERTIFICATE OF CORRECTION

PATENT NO. : 12,270,494 B2  
APPLICATION NO. : 17/148351  
DATED : April 8, 2025  
INVENTOR(S) : Jean-Aurélien Damour et al.

Page 1 of 1

It is certified that error appears in the above-identified patent and that said Letters Patent is hereby corrected as shown below:

On the Title Page

After item (65) insert:  
--(30) Foreign Application Priority Data  
January 13, 2020 (FR)....................................... 2000253--

Signed and Sealed this  
Fourth Day of November, 2025

John A. Squires  
*Director of the United States Patent and Trademark Office*